United States Patent [19]
Ichihara

[11] Patent Number: 5,499,177
[45] Date of Patent: Mar. 12, 1996

[54] INVERTER DEVICE WITH A CIRCUIT FOR GENERATING PULSE WIDTH MODULATION SIGNALS

[75] Inventor: Takao Ichihara, Kawasaki, Japan

[73] Assignee: Fuji Electric Co., Ltd., Kawasaki, Japan

[21] Appl. No.: 330,137

[22] Filed: Oct. 26, 1994

Related U.S. Application Data

[63] Continuation-in-part of Ser. No. 49,864, Apr. 20, 1993, Pat. No. 5,404,116.

[30] Foreign Application Priority Data

Apr. 22, 1992 [JP] Japan .................................. 4-103206

[51] Int. Cl.$^6$ .................................................. H05B 6/68
[52] U.S. Cl. .............................. 363/37; 363/97; 363/131; 323/283
[58] Field of Search .................................. 363/37, 36, 41, 363/95, 131, 96, 97, 98, 132; 323/283; 219/490, 492

[56] References Cited

U.S. PATENT DOCUMENTS

| | | | |
|---|---|---|---|
| 4,931,609 | 6/1990 | Aoki | 219/10.55 |
| 4,994,950 | 2/1991 | Gritter | 363/41 |
| 5,404,089 | 4/1995 | Flanagan et al. | 318/811 |

Primary Examiner—Peter S. Wong
Assistant Examiner—Aditya Krishnan
Attorney, Agent, or Firm—Kanesaka & Takeuchi

[57] ABSTRACT

An inverter device with a circuit for generating pulse width modulation (PWM) signal is formed of an inverter section and a circuit. The circuit includes an U/D counter 4 for regulating a control cycle of a PWM waveform, a register 1C for storing on-timing information of the PWM waveform, and a register 1D for storing off-timing information of the PWM waveform. The circuit is actuated by one of first and second modes. In the first mode, the PWM waveform is outputted by comparing an output of the counter 4 with the respective outputs of the registers 1C, 1D. In the second mode, the counter 4 counts down a signal, and after reaching zero, the counter counts up again, which is made within one cycle and is compared with only the output of the register 1C to output the PWM waveform. In the second mode, the reset level is not calculated, so that load to CPU is relieved, and the carrier cycle is shortened.

6 Claims, 4 Drawing Sheets

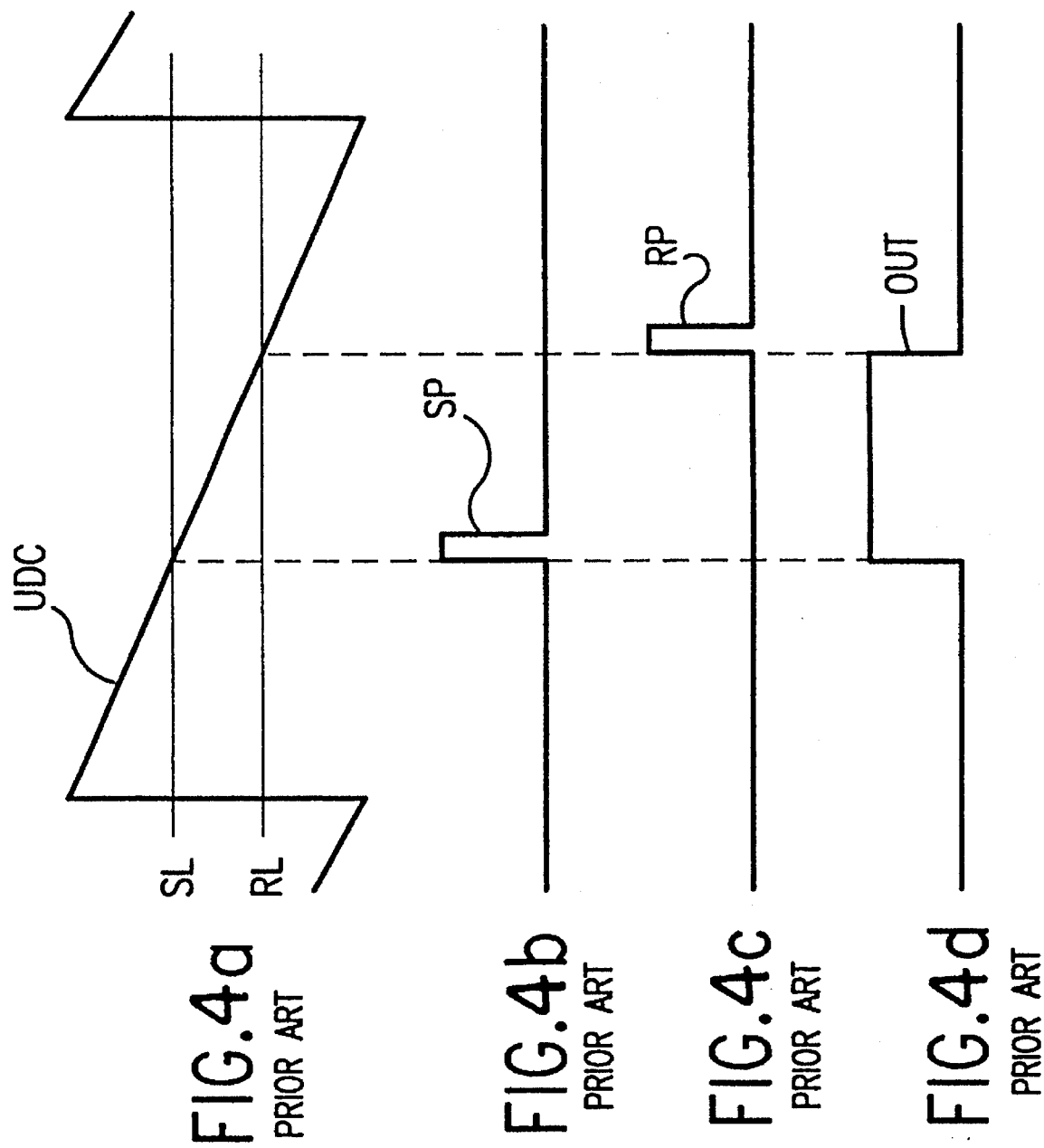

INVERTER DEVICE WITH A CIRCUIT FOR GENERATING PULSE WIDTH MODULATION SIGNALS

CROSS-REFERENCE TO RELATED APPLICATION

This is a continuation in part application of Ser. No. 08/049,864 filed on Apr. 20, 1993, now U.S. Pat. No. 5,404,116.

BACKGROUND OF THE INVENTION AND RELATED ART STATEMENT

The present invention relates to an inverter device with a circuit for generating pulse width modulation (PWM) signals suitable for controlling the inverter.

As a conventional system for generating PWM signals, a system as shown in FIGS. 4(a)–4(d) is known, wherein a counter, which is preset to a carrier cycle for indicating a control cycle of PWM, operates to count down a signal as shown in FIG. 4(a), and a counter output UDC is compared with contents of registers storing two kinds of level information, i.e. a set level SL and a reset level RL. When the counter output UDC coincides with the set level SL, a set pulse SP is outputted as shown in FIG. 4(b) to turn on an PWM power OUT as shown in FIG. 4(d), and when the counter output UDC coincides with the reset level RL, a reset pulse RP is outputted as shown in FIG. 4(c) to turn off the PWM power OUT.

Namely, in the above system, it is required to calculate two points for the set level and the reset level in order to output a PWM waveform, which is generally calculated by CPU or a computer. However, in case a carrier cycle becomes short, the CPU is short of calculation time, so that the minimum value for the carrier cycle is determined by a calculation time of CPU.

Accordingly, one object of the invention is to provide an inverter device with a circuit for generating pulse width modulation signals, which operates to relieve load for a CPU and to shorten the carrier cycle.

Another object of the invention is to provide an inverter device as stated above, wherein the circuit for generating PWM signals can control the inverter device as in a conventional method to thereby commonly use hard wares.

SUMMARY OF THE INVENTION

In order to solve the above problems, an inverter device with a circuit for generating pulse width modulation (PWM) signals comprises an inverter section and a circuit for generating the PWM signals. The inverter section includes a rectifier for changing an alternating current to a direct current, a smoothing capacitor connected to a direct current side of the rectifier, and an inverter for changing the direct current smoothed by the smoothing capacitor to an alternating current with variable voltage and frequency by the control of PWM signals. The circuit for generating PWM signals includes a counter for deciding a control cycle of a waveform of PWM, a first register for storing on-timing information of the waveform of PWM, and a second register for storing off-timing information of the waveform of PWM.

The circuit is actuated by one of first and second modes. The first mode is to automatically generate on-off timing of the waveform of PWM, which is made by comparing the output of the counter with the respective outputs of the first and second registers. The second mode is to automatically generate on-off timing of the waveform of PWM, which is made by, within one cycle, counting down the output of the counter and counting up the output after reaching a predetermined value, and comparing the output with only the output of the first register.

In the second mode for generating PWM signals by using only the set level, it is unnecessary to calculate the reset level, so that it is possible to shorten the carrier cycle when comparing the conventional system. However, in this mode, the output waveform for PWM is symmetrical in left and right with respect to an axis at a half point of the carrier cycle. In the first or conventional mode for generating the PWM signals by utilizing the set and reset levels, it is possible to obtain a PWM output waveform in a specific pattern, for example, a waveform compensating a switching time of the switching element of the inverter.

BRIEF DESCRIPTION OF THE DRAWINGS

FIGS. 4(a)–4(d) are waveform diagrams for explaining a prior art.

DETAILED DESCRIPTION OF PREFERRED EMBODIMENT

Figure 1:
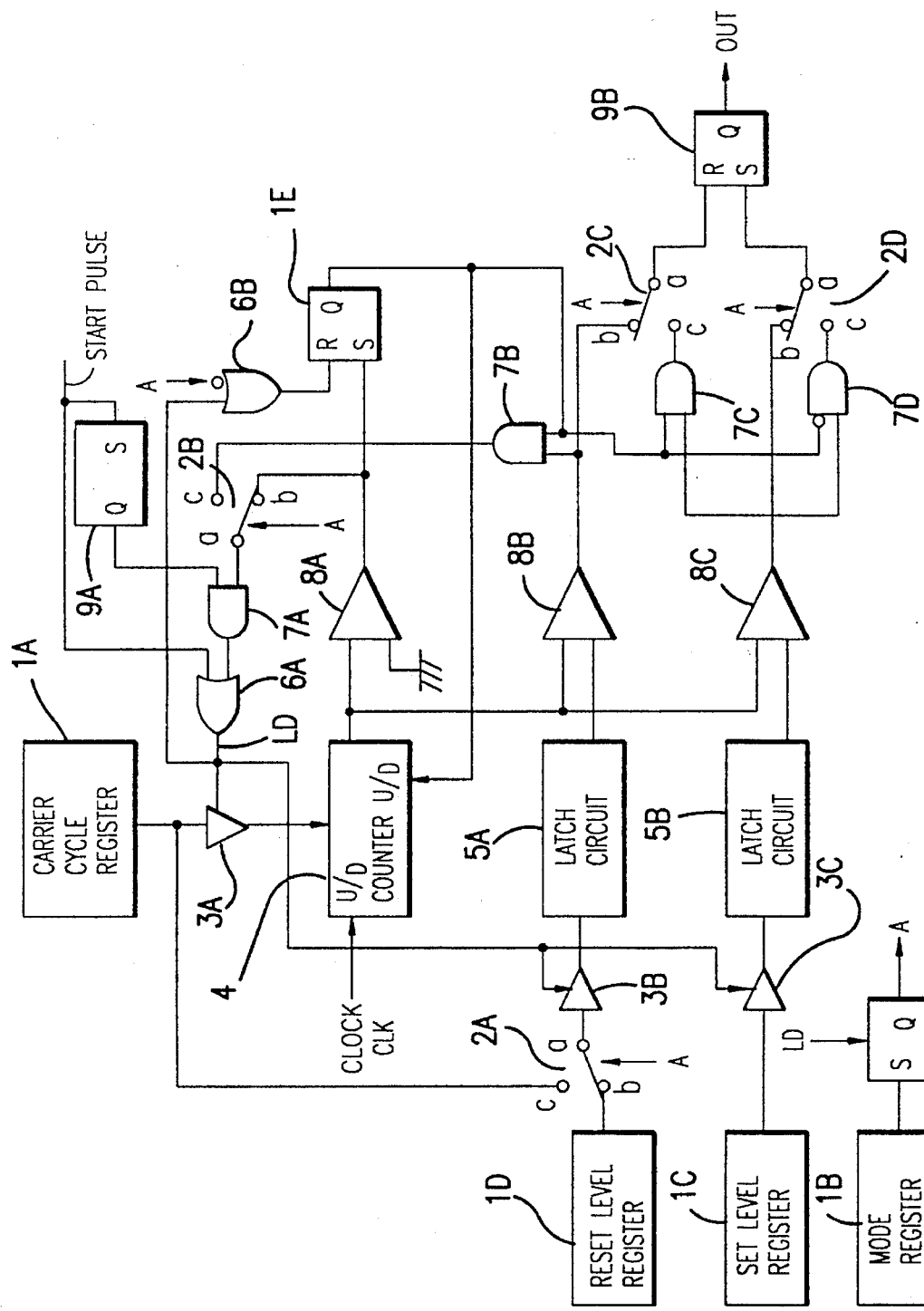
FIG. 1 is a circuit diagram for showing a PWM signal generating circuit of the present invention.

FIG. 1 shows a circuit diagram for showing a PWM signal generating circuit used in the present invention. In FIG. 1, 1A–1E are registers, 2A–2D are change-over switches, 3A–3C are transfer gates, 4 is an up/down (U/D) counter, 5A and 5B are latch circuits, 6A and 6B are OR gates, 7A–7D are AND gates, 8A–8C are comparators, and 9A–9C are flip-flops.

Namely, a mode register 1B is a register for changing an operation mode, wherein in case the output of the register 1B is "0", the circuit provides a conventional mode, which outputs a PWM waveform by utilizing a set level and a reset level, while in case the output of the register 1B is "1", the circuit provides a mode outputting a PWM waveform by utilizing only a set level.

In this respect, a flip-flop 9C is provided at an output side of the mode register 1B, so that an output A is outputted in accordance with a load signal LD. Also, in case the output A is "1", a half of a carrier cycle is set in a carrier cycle register 1A, a set level is set in a set level register 1C, and in the change-over switches 2A–2D, the positions (a–b) as shown are changed to positions (a–c).

In this respect, in case the output A of the flip-flop 9C is "1", when a start pulse ST is supplied, this is memorized in the flip-flop 9A, and a load signal LD is generated through the OR gate 6A, wherein the content of the carrier cycle register 1A is preset in the up/down (U/D) counter 4 through the transfer gate 3A, and is stored in the latch circuit 5A through the contacts c-a of the change-over switch 2A and the transfer gate 3B. Further, the content of the set level register 1C is stored in the latch circuit 5B through the transfer gate 3C. Also, the U/D change-over register 1E is reset to "0", so that the U/D counter 4 becomes a down counting mode.

Accordingly, the U/D counter 4 counts a clock signal CLK downwardly, and when the count value coincides with that of the latch circuit 5B, an output of the comparator 8C becomes active, which sets the flip-flop 9B through the AND gate 7D and the contacts c-a of the change-over switch 2D to turn on the PWM output OUT. When the U/D counter 4 counts downwardly to become zero, which may be one or other predetermined number, the output of the comparator 8A becomes active to set the U/D change-over register 1E.

By this output, the U/D counter 4 is changed to the up-count mode. Accordingly, the U/D counter counts the clock signal CLK upwardly (increment). And, when the count output coincides with the content of the latch circuit 5B, the output of the comparator 8C becomes active, which resets the flip-flop 9B through the AND gate 7C and the contacts c-a of the change-over switch 2C to turn off the PWM output OUT.

Further, as the output of the U/D counter 4 increases to coincide with the content of the latch circuit 5A, the output of the comparator 8B becomes active, which generates the load signal LD by passing through the AND gate 7B, the contacts c-a of the change-over switch 2B, the AND gate 7A and OR gate 6A. The load signal LD operates to load the value of the next carrier register 1A to the U/D counter 4 and the latch circuit 5A and to store the content of the set level register 1C to the latch circuit 5B, to thereby transfer to the next PWM cycle.

Figure 2:
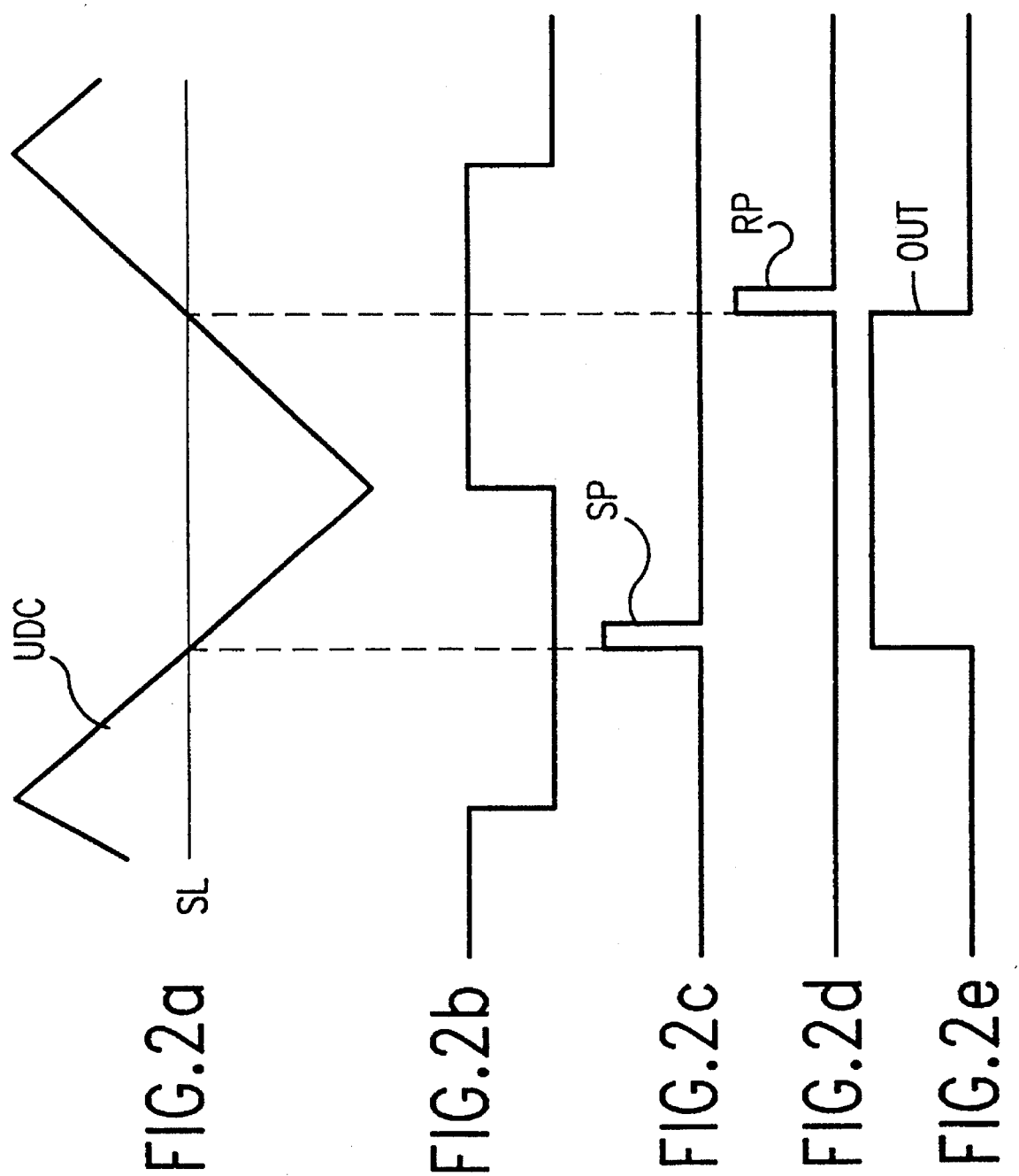
FIGS. 2(a)–2(e) are waveform diagrams for explaining an operation of FIG. 1.

The above operations are shown in FIGS. 2(a)–2(e). FIG. 2(a) shows a relation between the output of the U/D counter 4 and the content of the set level register 1C. FIG. 2(b) shows an U/D mode flag, wherein the downward counting is in a low level, and the upward counting is in a high level. FIG. 2(c) shows a set pulse. FIG. 2(d) shows a reset pulse. FIG. 2(e) shows PWM output OUT.

When the output of the mode register 1B is set to "0", the U/D counter 4 is set to a down count mode through the OR gate 6B. In this situation, in case the load signal LD is provided, the content of the carrier cycle register 1A is preset in the U/D counter 4. The content of the reset level register 1D is stored in the latch circuit 5A through the contacts b-a of the change-over switch 2A and the transfer gate 3B. The content of the set level register 1C is stored in the latch circuit 5B through the transfer gate 3C. As the U/D counter 4 counts the clock CLK downwardly to coincide with the content of the latch circuit 5B, the output of the comparator 8C becomes active, which sets the RS flip-flop 9B through the contacts b-a of the change-over switch 2D to turn on the PWM output OUT.

Also, in case the counter output of the U/D counter 4 coincides with the content of the latch circuit 5A, the output of the comparator 8B becomes active, which resets the RS flip-flop 9B through the contacts b-a of the change-over switch 2C to turn off the PWM output OUT. And, when the output of the U/D counter 4 becomes zero, the output of the comparator 8A becomes active to generate the load signal LD by passing through the contacts b-a of the change-over switch 2B, AND gate 7A and OR gate 6A, whereby the carrier cycle, set level and reset level are renewed to move to the next operation.

Figure 3:
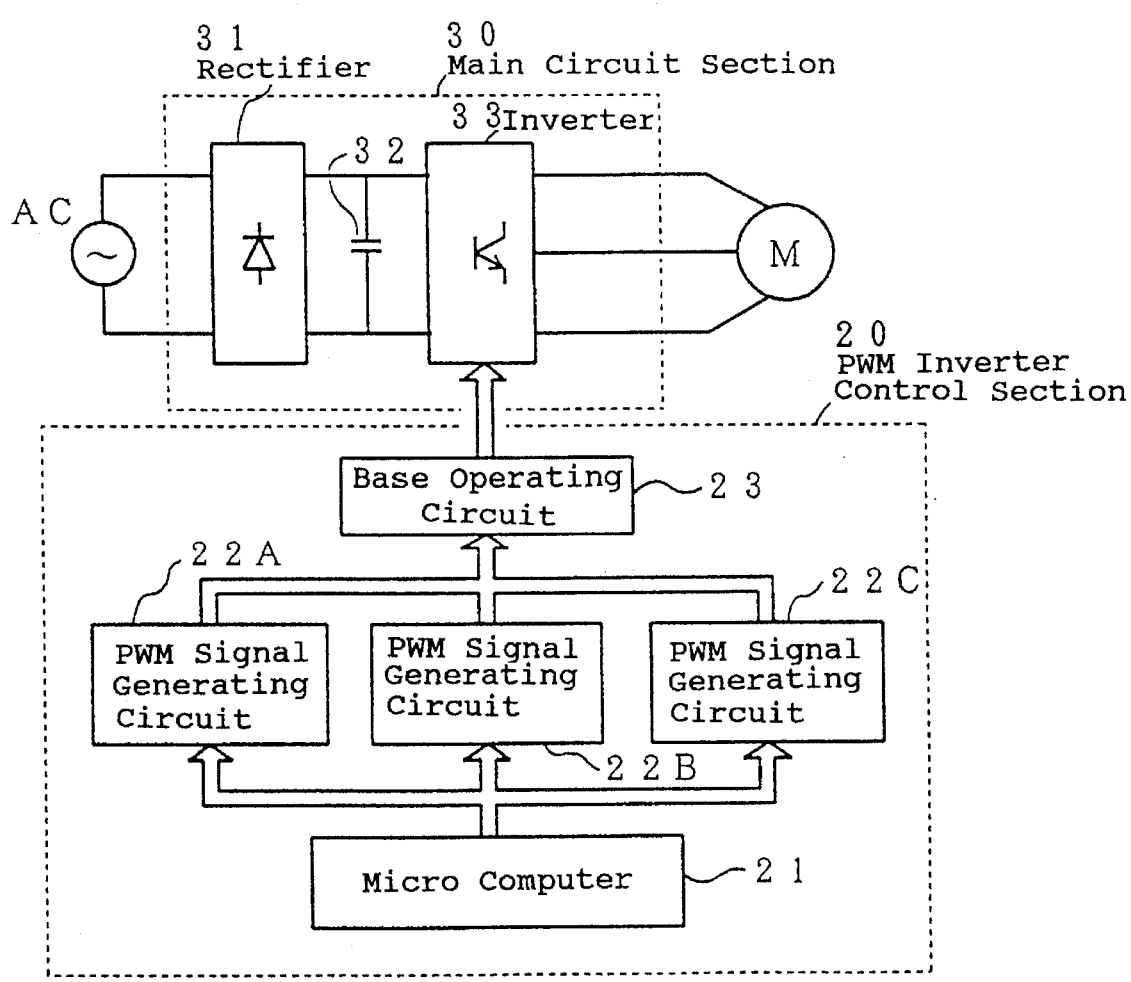
FIG. 3 is a circuit diagram for showing an inverter with the PWM signal generating circuit.

FIG. 3 shows a circuit diagram for showing an embodiment of the PWM inverter device having the PWM signal generating circuit explained above. In the drawing, 20 is a PWM inverter control section; 21 is a micro computer formed of a CPU, RAM, ROM and so on; 22A–22C are PWM signal generating circuits, which can be operated either by a mode for generating the PWM signals utilizing only the set level or a mode for generating the PWM signals utilizing set and reset levels; 23 is a base operating circuit; 30 is a main circuit section for the PWM inverter device; 31 is a rectifier; 32 is a smoothing capacitor; 33 is an inverter; AC is a commercial electric source; and M is a motor.

Namely, the PWM inverter device is formed of the main circuit section 30 for the PWM inverter and the PWM inverter control section 20. The main circuit section 30 changes the commercial electric source AC from the alternating current to the direct current by means of the rectifier 31 and smooths the current by the smoothing capacitor 32 to supply electricity to the inverter 33. The inverter 33 is formed of semiconductor switching elements, such as transistors and so on, and supplies alternating voltage changed to three phase voltage by three phase signals from the base operating circuit 23 to the motor M.

In the first mode generating the PWM signals by the set and reset levels, the above mode signal, clock signal and data for the carrier cycle, set level and reset level are provided from the micro computer 21 to the PWM signal generating circuits 22A–22C in the PWM inverter control section 20. Thereafter, the micro computer 21 provides a start pulse signal to the PWM signal generating circuits 22A–22C, so that the PWM signal generating circuits 22A–22C generate three phase PWM signals to provide to the base operating circuit 23. In the base operating circuit 23, the three phase PWM signals are changed to base operating signals, which are provided to the inverter 33, so that the inverter 33 generates alternating voltage with three phase PWM waveforms. Thereafter, the micro computer 21 calculates the data for the set and reset levels, and provides the data to the PWM signal generating circuits 22A–22C. Thus, the inverter 33 continuously supplies an appropriate three phase alternating voltage to the motor M.

In the second mode generating the PWM signals by the set level only, the above mode signal, clock signal and data for the carrier cycle and set level are provided from the micro computer 1 to the PWM signal generating circuits 22A–22C. Thereafter, the start pulse signal is provided from the micro computer 21 to the PWM signal generating circuits 22A–22C. Thus, the PWM signal generating circuits 22A–22C generate the three phase PWM signals to provide to the base operating circuit 23. In the base operating circuit 23, the three phase PWM signals are changed to base operating signals, which are provided to the inverter 33, so that the inverter 33 generates alternating voltage with three phase PWM waveforms. Thereafter, the micro computer 21 calculates the data for the set level and provides the data to the PWM signal generating circuits 22A–22C. Thus, the inverter 33 continuously supplies an appropriate three phase alternating voltage to the motor M.

In accordance with the present invention, in a mode to generate a PWM signal by utilizing only the set level, it is unnecessary to calculate the reset level, so that it has an advantage that the carrier cycle can be shortened when comparing with the conventional system. Further, in a conventional mode for generating a PWM signal by utilizing the set level and the reset level, it is possible to obtain the PWM output waveform in a specific pattern, for example compensating the switching time of the switching element of the inverter.

The inverter with the PWM signal generating circuit can be operated by either one mode wherein the PWM signals can be generated by utilizing only the set level, or the other mode wherein the PWM signals can be generated by utilizing the set and reset levels. Thus, the inverter can be used commonly for the two operating modes.

While the invention has been explained with reference to the specific embodiments of the invention, the explanation is illustrative, and the invention is limited only by the appended claims.

What is claimed is:

1. An inverter device with a circuit for generating pulse width modulation signals, comprising, an inverter section including a rectifier for changing an alternating current to a direct current, a smoothing capacitor connected to a direct current side of the rectifier, and an inverter for changing the direct current smoothed by the smoothing capacitor to an alternating current with variable voltage and frequency by a control of pulse width modulation, and a circuit for generating pulse width modulation signal including;

a counter for counting a signal and regulating a control cycle of a waveform of pulse width modulation, first register means for storing first information of the waveform of pulse width modulation, second register means for storing second information of the waveform of pulse width modulation, and a mode register for actuating one of first and second modes for automatically generating on-off timing of the waveform of pulse width modulation, wherein when the first mode is selected in the mode register, the mode register actuates the counter, output of the signal counted by the counter being compared with the information of the first and second register means so that an on-timing signal is outputted when the output of the counter coincides with the first information of the first register means and an off-timing signal is outputted when the output of the counter coincides with the second information of the second register means, and wherein when the second mode is selected in the mode register, the mode register actuates the counter within one cycle to automatically count down and count up again the signal after reaching a predetermined value so that an on-timing signal is outputted when the output of the counter at first coincides with the first information of the first register means and an off-timing signal is outputted when the output of the counter again coincides with the first information of the first register means after the signal reaches the predetermined value.

2. An inverter device according to claim 1, further comprising a carrier cycle register connected to the counter for setting the counter between the first and second modes.

3. An inverter device according to claim 2, wherein said counter is an up/down counter, said carrier cycle register setting one half of a carrier cycle of the carrier cycle register to the up/down counter when the second mode is selected.

4. An inverter device according to claim 3, further comprising an up/down change-over register to change a counting mode of the counter when reaching the predetermined value in the second mode.

5. An inverter device according to claim 4, wherein said first and second register means include comparators to compare the respective information of the first and second register means with the signal from the counter, said comparators being connected to a set/reset flip-flop for the pulse width modulation signal in the first mode.

6. An inverter device according to claim 1, wherein said second register means includes a latch circuit, said latch circuit, in the second mode, holding information of the control cycle of the waveform in the counter to transfer to a next pulse width modulation cycle after a first cycle is completed.

* * * * *